(12) United States Patent
Matsumoto (10) Patent No.: US 11,585,394 B2
(45) Date of Patent: Feb. 21, 2023

(54) WORK MACHINE (71) Applicant: HONDA MOTOR CO., LTD., Tokyo (JP)

(72) Inventor: Takuya Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 368 days.

(21) Appl. No.: 16/764,888

(22) PCT Filed: Nov. 22, 2017

(86) PCT No.: PCT/JP2017/042065
§ 371 (c)(1),
(2) Date: May 18, 2020

(87) PCT Pub. No.: WO2019/102558
PCT Pub. Date: May 31, 2019

(65) Prior Publication Data
US 2020/0340539 A1 Oct. 29, 2020

(51) Int. Cl.
*F16D 41/12* (2006.01)
*A01D 34/69* (2006.01)
*A01D 69/08* (2006.01)
*A01D 101/00* (2006.01)

(52) U.S. Cl.
CPC ............. *F16D 41/12* (2013.01); *A01D 34/69* (2013.01); *A01D 69/08* (2013.01); *A01D 2101/00* (2013.01)

(58) Field of Classification Search
CPC .. A01D 34/6812; B62K 23/08; B60K 7/0007; B62M 1/24; B41B 25/10; H01L 21/67144; F16D 55/225; F16D 41/06; F16D 41/16; F16D 41/12
See application file for complete search history.

(56) References Cited

U.S. PATENT DOCUMENTS 3,738,560 A * 6/1973 Kulicke, Jr. ...... H01L 21/67144
                                                    219/79
4,273,455 A * 6/1981 Gubelmann ............ B41B 25/10
                                                    400/310
5,351,575 A * 10/1994 Overby .................... B62M 1/24
                                                    74/594.1

(Continued)

OTHER PUBLICATIONS

International Search Report and Written Opinion for International Application No. PCT/JP2017/042065 dated Feb. 20, 2018, 10 pages.

*Primary Examiner* — Yuri Kan
(74) *Attorney, Agent, or Firm* — Amin, Turocy & Watson, LLP (57) ABSTRACT

This work machine is provided with a clutch mechanism which is provided on a motive power transmission path between a drive source and a wheel. The clutch mechanism is provided with: a drive shaft with which drive force from the drive source is transmitted; a key member which is provided so as to be capable of moving relative to the drive shaft; a driven member which is driven by the drive shaft via the key member; an impelling member which impels the key member towards the driven member; and a ratchet holder which is provided with an engagement groove and a guide part, and which is provided so as to be capable of rotating coaxially with the drive shaft.

15 Claims, 9 Drawing Sheets

(56) References Cited

U.S. PATENT DOCUMENTS

| | | | |
|---|---|---|---|
| 6,354,414 B1 * | 3/2002 | Sueshige | B60K 7/0007 192/45.005 |
| 6,945,376 B1 * | 9/2005 | Hunter | B62K 23/08 192/114 R |
| 7,777,444 B2 * | 8/2010 | Kawakami | F16D 41/16 318/362 |
| 10,550,899 B2 * | 2/2020 | Vaughn | F16D 41/06 |
| 2005/0166565 A1 | 8/2005 | Adams et al. | |
| 2016/0032994 A1 * | 2/2016 | Sakashita | F16D 55/225 188/72.3 |

* cited by examiner

WORK MACHINE

TECHNICAL FIELD

The present invention relates to a work machine including a clutch mechanism between a drive shaft and a wheel.

BACKGROUND ART

Rotary lawn mowers are known as a type of work machines, for example (refer to U.S. Patent Application Publication No. 2005/0166565, for example). The rotary lawn mowers cut grass by rotating along the grass a cutter blade accommodated in a housing having an opened bottom. Lawn mowers of this type include a driving source such as an engine, and a transmission device for transmitting the driving force of the driving source to the wheels. The transmission device has a drive shaft that is rotated by the driving force of the driving source.

SUMMARY OF INVENTION

When the operator moves the work machine while the driving source is at a standstill, if the drive shaft and wheels are coupled together in a power transmittable manner, moving the work machine is very laborious for the operator because the driving source and the wheels are coupled together. Accordingly, a configuration is proposed in which a one-way clutch mechanism having a key member is disposed between the drive shaft and wheels so that the power transmission between the drive shaft and wheels is disconnected when the operator pushes the work machine and rotates the wheels in the normal direction while the driving source is not working. This configuration allows the operator to easily move the work machine forward when the driving source is at a standstill.

However, with such a work machine adopting the one-way clutch mechanism, when the operator rotates the wheels in the reverse direction with the driving source standing still, then the wheels cannot spin relative to the drive shaft because the drive shaft and wheels are not mechanically disconnected. Moving the work machine backward is therefore very laborious for the operator.

The present invention has been devised considering such a problem, and an object of the present invention is to provide a work machine that allows wheels to spin relative to the drive shaft in both of the forward and rearward directions when the driving source is at a standstill.

In order to achieve the object above, the present invention relates to a work machine including: a driving source; a wheel for travel configured to be driven by a driving force of the driving source; and a clutch mechanism disposed on a motive power transmission route between the driving source and the wheel. The clutch mechanism includes: a drive shaft to which the driving force from the driving source is transmitted; a key member that is movable with respect to the drive shaft; a driven member that is rotatable coaxially with the drive shaft and is configured to be driven by the drive shaft through the key member; a biasing member configured to elastically bias the key member against the driven member; and a ratchet holder including an engagement groove engageable with the key member, and a guide portion configured to guide the key member, the ratchet holder being rotatable coaxially with the drive shaft. When the drive shaft rotates in a first rotational direction based on the driving force of the driving source, the driven member is rotationally driven in the first rotational direction by the drive shaft through the key member. When the driven member rotates in the first rotational direction by a force transmitted from the wheel, the driven member rotates in the first rotational direction relative to the drive shaft, while pressing the key member into the drive shaft against a biasing force of the biasing member. When the driven member rotates in a second rotational direction opposite to the first rotational direction by a force transmitted from the wheel, the guide portion of the ratchet holder presses the key member into the drive shaft so as to release engagement between the key member and the driven member, and the driven member rotates in the second rotational direction relative to the drive shaft.

According to the work machine having the configuration above, when the driven member rotates in the first rotational direction, the driven member itself presses the key member into the drive shaft, allowing the driven member to spin in the first rotational direction relative to the drive shaft. Further, when the driven member rotates in the second rotational direction, the engagement between the key member and driven member is released, allowing the driven member to spin in the second rotational direction relative to the drive shaft. In this way, according to the work machine, it is possible to cause the wheel to spin relative to the drive shaft in both the forward and rearward directions while the driving source is standing still. The work machine can thus be moved easily while the driving source is at a standstill.

The work machine may further include a control unit configured to control the driving source. After the driving source has been stopped based on a stopping operation performed by the operator, the control unit may control the driving source so as to rotate the drive shaft by a given angle in the second rotational direction, to thereby release the engagement between the key member and driven member.

With this configuration, the wheel can always be disconnected from the power system when the driving source stops, eliminating the need for the operator to reversely rotate the wheel after the driving source stopped. This further reduces labor of the operator.

The clutch mechanism may include a holding member configured to hold the ratchet holder and allowing the ratchet holder to rotate when a certain or larger rotational force acts on the ratchet holder.

It is thus possible to control rotation and non-rotation of the ratchet holder with a simple structure, according to the force acting on the holding member.

When the drive shaft rotates in the first rotational direction based on the driving force of the driving source, the ratchet holder may rotate in the first rotational direction, while sliding relative to the holding member.

This configuration allows the drive shaft to smoothly rotate in the first rotational direction based on the driving force of the driving source.

When the driven member rotates in the second rotational direction by a force transmitted from the wheel, the holding member may prevent the ratchet holder from rotating in the second rotational direction.

With this configuration, it is possible to certainly press in the key member by the guide portion as the drive shaft rotates in the second rotational direction.

The holding member may be a friction spring configured to hold the ratchet holder with an elastic force.

It is thus possible to restrict the rotation of the ratchet holder under a given condition, using a simple structure.

A restricting structure may be disposed between the ratchet holder and the drive shaft, the restricting structure being configured to stop relative rotation between the ratchet holder and the drive shaft when the drive shaft has moved to a position where the engagement between the key member and the driven member is released.

With this configuration, the rotational phase between the ratchet holder and the drive shaft is maintained. This enables the key member to be surely kept pressed into the drive shaft.

The restricting structure may include a restricting protrusion protruding radially outward from the drive shaft, and an arc-shaped groove which is formed in the ratchet holder and in which the restricting protrusion is inserted.

Thus, it is possible to stop the relative rotation between the ratchet holder and the drive shaft with a simple configuration at the time when the drive shaft has rotated by a given angle in the second rotational direction.

The key member may include a first engagement portion engageable with the driven member, and a second engagement portion engageable with the engagement groove of the ratchet holder, and the key member may be tiltable relative to the drive shaft. The first engagement portion may be disposed between a tilting fulcrum of the key member and the second engagement portion.

With this configuration, it is possible to cause the key member to suitably operate according to the phase between the drive shaft, and the driven member and ratchet holder in the rotational direction.

The biasing member may be disposed between the key member and the drive shaft so as to bias a portion of the key member that is located between the second engagement portion and the tilting fulcrum.

This configuration allows the key member to tilt suitably.

A tilt support member having the tilting fulcrum may be fixed to the drive shaft.

It is thus possible to tilt the key member relative to the drive shaft with a simple structure.

The tilt support member may be formed as a ring-like washer member including an inner protrusion protruding radially inward and functioning as the tilting fulcrum, and the washer member may prevent the driven member from coming off the drive shaft.

Thus, the tilt support member functions both as a retainer for the driven member and as the tilting fulcrum of the key member, whereby the structure is streamlined.

The key member may include a groove in which the inner protrusion is inserted.

This configuration prevents displacement between the key member and the drive shaft in the axial direction.

The wheel may have an inner circumferential portion formed as an internal gear, and the driven member may be a gear member that meshes with the internal gear of the wheel.

The work machine may be a lawn mower.

DESCRIPTION OF EMBODIMENTS

The work machine according to the present invention will be described below referring to the accompanying drawings in conjunction with preferred embodiments.

Figure 1:
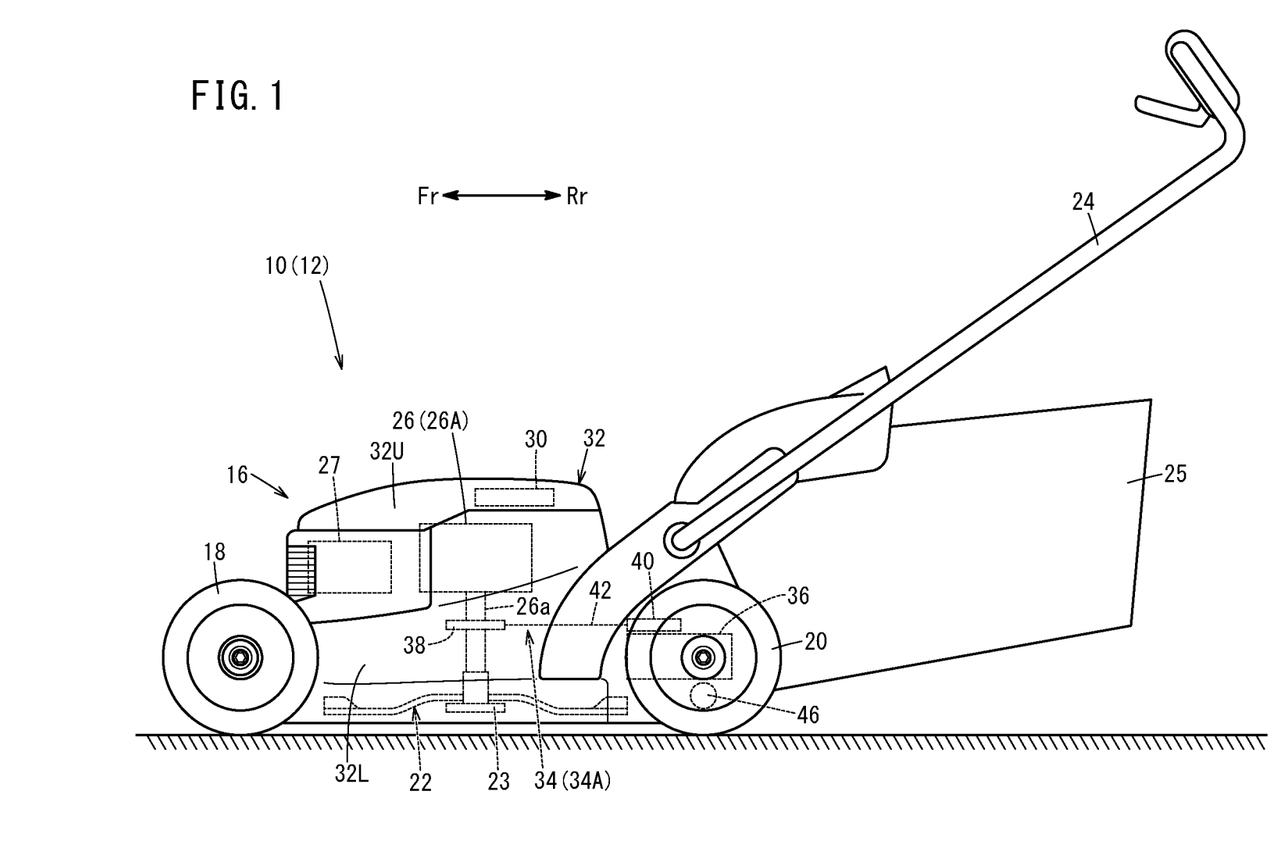
FIG. 1 is a side view of a work machine according to an embodiment of the present invention.

A work machine 10 of this embodiment shown in FIG. 1 is a walk-type self-propelled lawn mower 12 for cutting the grass on lawns. In FIG. 1, the arrow Fr shows the forward direction of the lawn mower 12 (the same direction as the forward direction seen from an operator), and the arrow Rr shows the rearward direction of the lawn mower 12 (the same direction as the rearward direction seen from the operator). "Right side" and "left side" of the lawn mower 12 respectively denote the right side and the left side seen from the operator who uses the lawn mower 12.

The lawn mower 12 includes a machine body 16, right and left wheels 18 disposed in the front part of the machine body 16 (front wheels), right and left wheels 20 disposed in the rear part of the machine body 16 (rear wheels), a cutter blade 22, for cutting grass, disposed at the bottom of the machine body 16, an operation handle 24 extending rearward from the machine body 16, and a mown grass storage 25 attached at the rear of the machine body 16.

The machine body 16 has a housing 32 constituting the exterior shape of the machine body 16, and a motor 26A serving as a driving source 26 for the cutter blade 22 and wheels 20. The housing 32 is a casing that is opened downward only in a part facing the ground (lawn).

The housing 32 includes a lower housing 32L that is opened downward, and an upper housing 32U that protrudes upward from the top of the lower housing 32L. The upper housing 32U contains therein the motor 26A, a battery 27 for supplying electric power to the motor 26A, and a control unit 30 configured to control the motor 26A. The cutter blade 22 is accommodated inside the lower housing 32L.

The motor 26A has an output shaft 26a projecting downward and extending into the housing 32. The cutter blade 22 is coupled to the output shaft 26a of the motor 26A through a blade holder 23, and rotates with the rotational driving force transmitted from the output shaft 26a. The cutter blade 22 is a plate-like, elongated member (so-called bar blade).

The driving force generated by the motor 26A is transmitted to the right and left wheels 20 as a travel driving force through a motive power transmission mechanism 34 coupled to the output shaft 26a and a motive power direction conversion mechanism 36. The right and left wheels 20 are thus configured as driving wheels. The driving force generated by the motor 26A may be transmitted to the right and left wheels 18 serving as the front wheels.

In this embodiment, the motive power transmission mechanism 34 has the form of a belt mechanism 34A. The belt mechanism 34A includes a driving pulley 38 fixed to the output shaft 26a, a driven pulley 40 coupled to the motive power direction conversion mechanism 36, and a driving belt 42 wound around the driving pulley 38 and the driven pulley 40. The motive power direction conversion mechanism 36 is a mechanism including a plurality of bevel gears, for example, and converts the rotational driving force around the vertical axis into a rotational driving force around an axis extending in the right-left direction of the machine body 16. A clutch mechanism 46 is provided on each of a motive power transmission route between the motor 26A and the left wheel 20 and a motive power transmission route between the motor 26A and the right wheel 20. That is, two clutch mechanisms 46 are provided corresponding to the right and left wheels 20. The right and left clutch mechanisms 46 have the same configuration except that they are bilaterally symmetrical, so the left-hand clutch mechanism 46 will be illustrated below without describing the configuration of the right-hand clutch mechanism 46.

Figure 2:
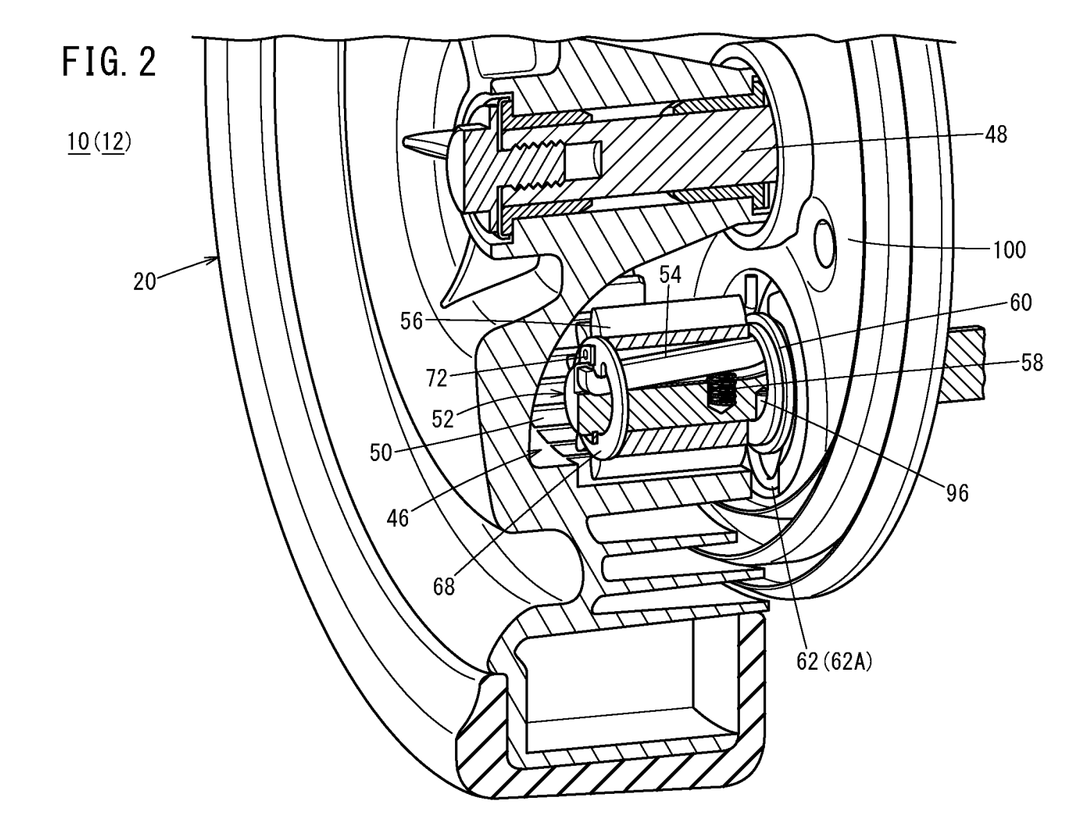
FIG. 2 is a perspective cross section of a wheel and a clutch mechanism.

As shown in FIG. 2, the wheel 20 serving as a driving wheel is rotatably supported by an axle support shaft 48 extending in the right-left direction. An inner circumferential portion of the wheel 20 forms an internal gear 50. In this embodiment, the clutch mechanism 46 is disposed in a position that is eccentric with respect to the center of the wheel 20 (axle support shaft 48). The clutch mechanism 46 may be disposed coaxially with the wheel 20.

Figure 3:
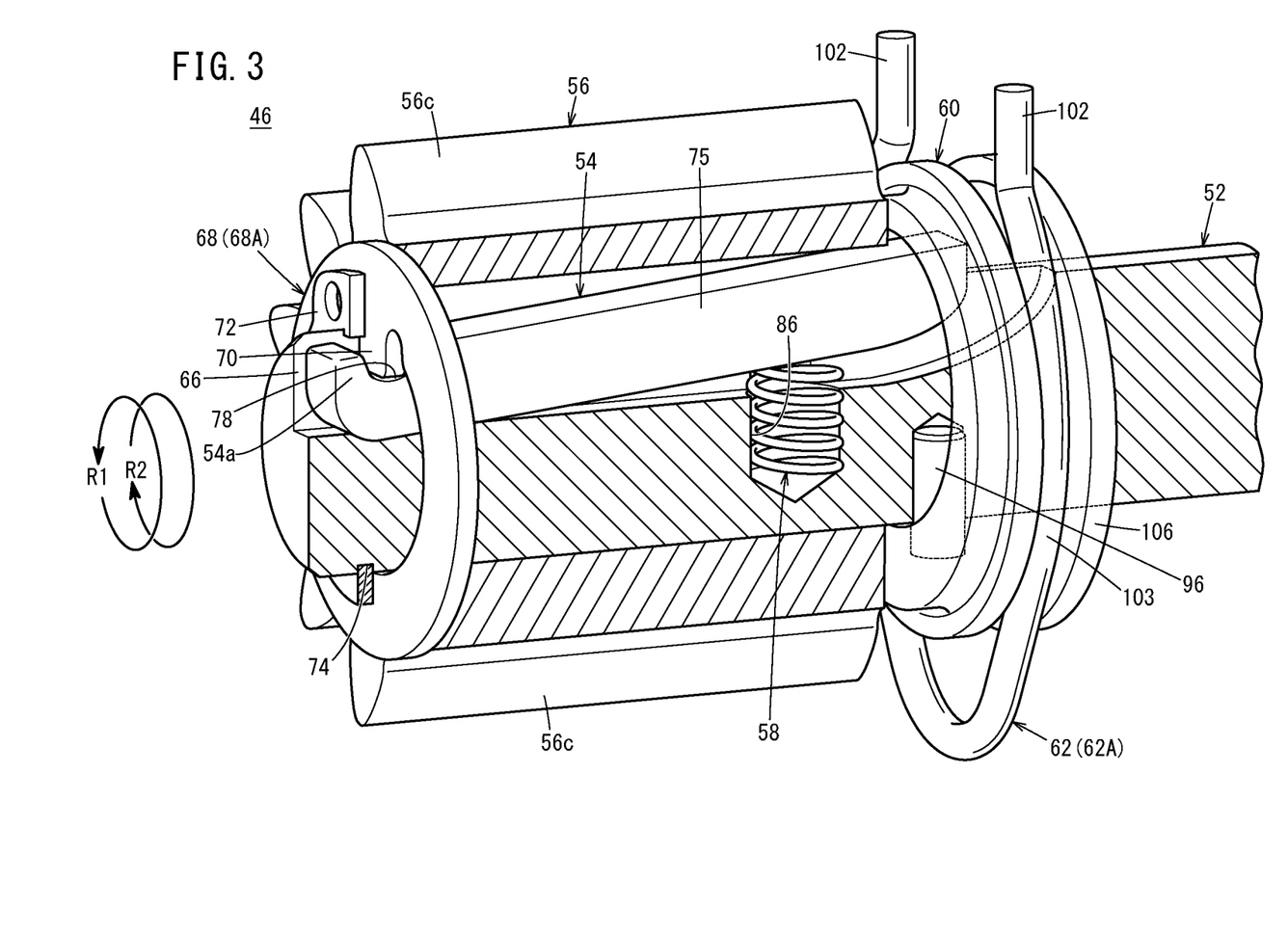
FIG. 3 is a perspective cross section of the clutch mechanism.

As shown in FIGS. 2 and 3, the clutch mechanism 46 includes a drive shaft 52 to which the driving force from the motor 26A is transmitted, a key member 54 that is movable with respect to the drive shaft 52, a driven member 56 that is rotatable coaxially with the drive shaft 52, a biasing member 58 elastically biasing the key member 54 against the driven member 56, a ratchet holder 60 that is rotatable coaxially with the drive shaft 52, and a holding member 62 for holding the ratchet holder 60.

Figure 4:
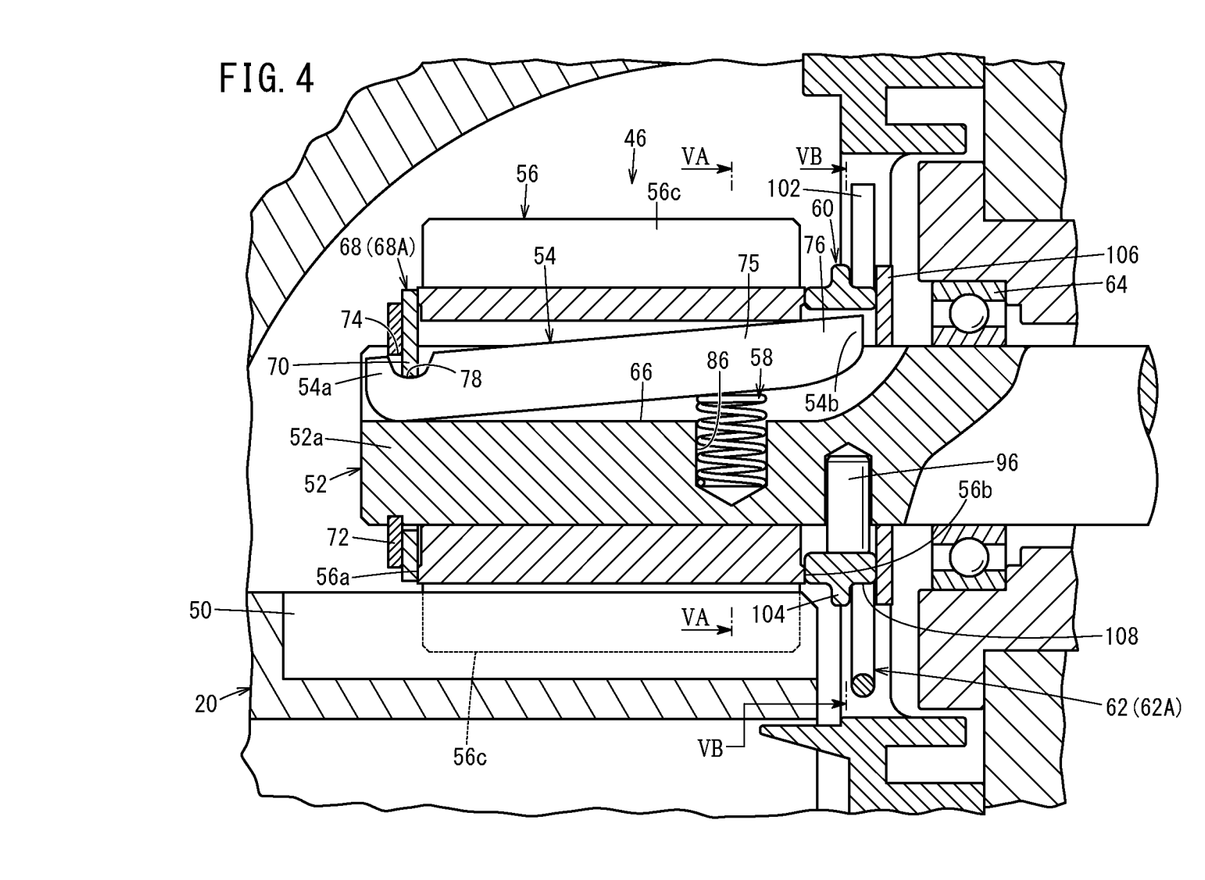
FIG. 4 is a cross section of the clutch mechanism along its axial direction.

The drive shaft 52 is disposed parallel to the right-left direction of the machine body 16 and coupled to the above-mentioned motive power direction conversion mechanism 36 (see FIG. 1). The drive shaft 52 is hence rotationally driven by the motor 26A (FIG. 1). As shown in FIG. 4, the drive shaft 52 is rotatably supported by a bearing 64. An end 52a of the drive shaft 52 is provided with a key placement groove 66 extending in the axial direction of the drive shaft 52. The key placement groove 66 is opened in the outer circumferential surface and the axial end surface of the drive shaft 52. The key member 54 is placed in the key placement groove 66.

The key member 54 is formed like a rod and disposed inside the driven member 56 and the ratchet holder 60 so as to be tiltable relative to the drive shaft 52. The key member 54 has a first end 54a and a second end 54b in its longitudinal direction and, at the first end 54a, engages with a tilt support member 68 fixed to the drive shaft 52. As shown in FIGS. 3 and 4, the tilt support member 68 is formed as a ring-like washer member 68A including an inner protrusion 70 that protrudes radially inward and that functions as the fulcrum of tilting of the key member 54.

The washer member 68A abuts on a first end 56a of the driven member 56 or its one end in the axial direction. A restraining part 72 is disposed adjacent to the washer member 68A. The restraining part 72 fits in a circumferential groove 74 formed in an outer circumferential portion of the drive shaft 52. The washer member 68A and the restraining part 72 prevent the driven member 56 from coming off the drive shaft 52.

When the drive shaft 52 rotates, the key member 54 rotates together with the drive shaft 52. The key member 54 has a first engagement portion 75 that can engage with the driven member 56, and a second engagement portion 76 that can engage with an engagement groove 88 of the ratchet holder 60. The key member 54 can tilt so that it appears from the key placement groove 66 of the drive shaft 52. FIGS. 3 and 4 show a state in which the key member 54 tilts with respect to the drive shaft 52 and the first engagement portion 75 and the second engagement portion 76 protrude from the key placement groove 66. The first engagement portion 75 is located between the tilting fulcrum of the key member 54 and the second engagement portion 76. The second engagement portion 76 protrudes from the driven member 56. The key member 54 includes a groove 78 in which the inner protrusion 70 of the washer member 68A is inserted. The groove 78 is formed at the first end 54a of the key member 54.

Figure 5A:
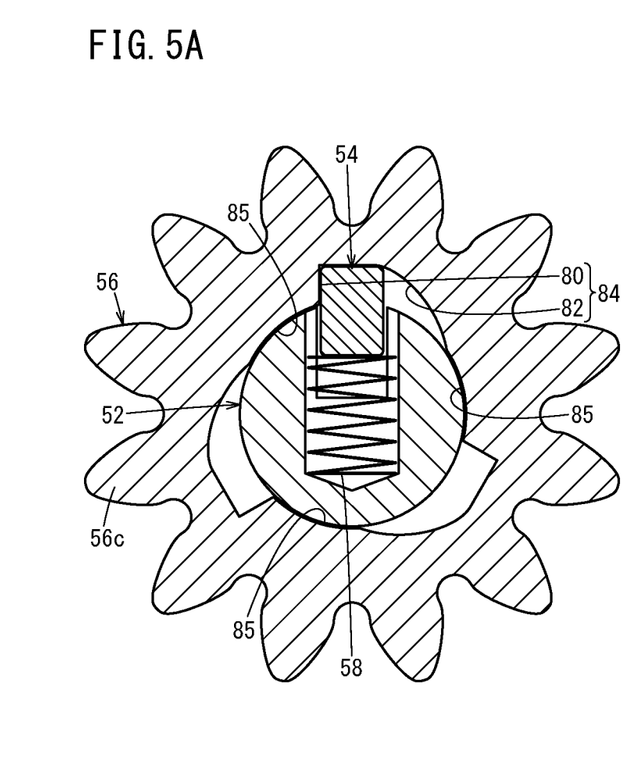
FIG. 5A is the cross section taken along line VA-VA in FIG. 4.

The driven member 56 is driven by the drive shaft 52 through the key member 54. In this embodiment, the driven member 56 is a gear member that meshes with the internal gear 50 of the wheel 20, and has teeth 56c formed in its outer circumferential portion. As shown in FIG. 5A, an inner circumferential portion of the driven member 56 is provided with, at intervals in the circumferential direction, a plurality of (three in this embodiment) first recessed shapes 84 each including an engagement groove 80 that can engage with the key member 54 and a guide portion 82 for guiding the key member 54 inward in the radial direction. The guide portion 82 is continuous to the engagement groove 80 and curved so as to approach the center of the driven member 56 as it separates from the bottom of the engagement groove 80 in the circumferential direction. The portions between the plurality of first recessed shapes 84 form inner support surfaces 85 that are supported on the outer circumferential surface of the drive shaft 52.

As shown in FIGS. 3 and 4, the biasing member 58 is disposed between the key member 54 and the drive shaft 52 so as to bias a portion of the key member 54 that is located between the second engagement portion 76 and the tilting fulcrum. Specifically, the drive shaft 52 is provided with a holding groove 86 communicating with the key placement groove 66, and the biasing member 58 is placed (inserted) in the holding groove 86. The biasing member 58 is in the form of a compression spring, one end of which abuts on the key member 54 to elastically bias the key member 54 against the driven member 56 and the ratchet holder 60.

Figure 5B:
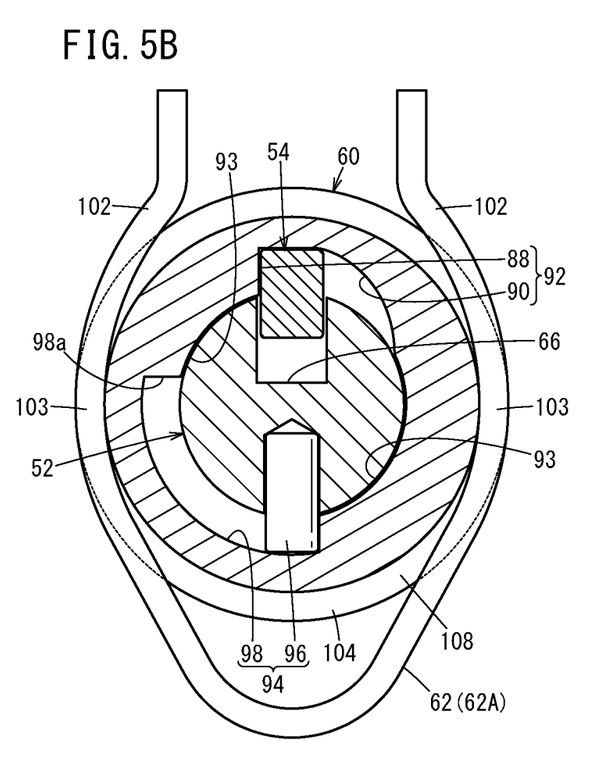
FIG. 5B is the cross section taken along line VB-VB in FIG. 4.

The ratchet holder 60 has a circular outer circumferential portion. The ratchet holder 60 is disposed adjacent to the driven member 56. In this embodiment, the ratchet holder 60 abuts on a second end 56b of the driven member 56 or its other end in the axial direction. As shown in FIG. 5B, an inner circumferential portion of the ratchet holder 60 is provided with a second recessed shape 92 including the engagement groove 88 that can engage with the key member 54 and a guide portion 90 for guiding the key member 54 inward in the radial direction.

The second recessed shape 92 has the same shape as the first recessed shapes 84 formed in the driven member 56. Hence, the guide portion 90 of the second recessed shape 92 is continuous to the engagement groove 88 and curved so as to approach the center of the ratchet holder 60 as it separates from the bottom of the engagement groove 88 in the circumferential direction. The portions on both sides of the second recessed shape 92 in the circumferential direction form inner support surfaces 93 that are continuous respectively to the engagement groove 88 and the guide portion 90 and supported on the outer circumferential surface of the drive shaft 52.

A restricting structure 94 is provided between the ratchet holder 60 and the drive shaft 52, the restricting structure 94 stopping the relative rotation between the ratchet holder 60 and the drive shaft 52 when the drive shaft 52 has moved to a position where the engagement between the key member 54 and the driven member 56 is released. Specifically, the restricting structure 94 includes a restricting protrusion 96 protruding radially outward from the drive shaft 52, and an arc-shaped groove 98 which is formed in the ratchet holder 60 and in which the restricting protrusion 96 is inserted.

In this embodiment, the restricting protrusion 96 is a pin that is fixed (press fitted) in the drive shaft 52. The restricting protrusion 96 may be a protrusion formed integrally with the drive shaft 52. The arc-shaped groove 98 extends like a circular arc with such a length that the restricting protrusion 96 can relatively move by a given angle (90 degrees in this embodiment) in the circumferential direction with respect to the ratchet holder 60. The arc-shaped groove 98 is located between the two inner support surfaces 93.

The holding member 62 holds the ratchet holder 60 in such a manner that it allows the ratchet holder 60 to rotate when a certain or larger rotational force acts on the ratchet holder 60. As shown in FIG. 2, the holding member 62 is non-rotatably attached to a plate 100 that is non-rotatably fixed to the machine body 16. As shown in FIGS. 3 and 5B, the holding member 62 is a friction spring 62A that holds the ratchet holder 60 with an elastic force. Specifically, the friction spring 62A is formed in a U-shape having a pair of arm portions 102, with the ratchet holder 60 held between the pair of arm portions 102. The pair of arm portions 102 each have an arc-shaped curved portion 103, the arc-shaped curved portion 103 abutting on the outer circumferential portion of the ratchet holder 60.

As shown in FIG. 4, an annular flange 104 protruding outward is formed on the outer circumferential portion of the ratchet holder 60. Further, a ring member 106 is placed adjacent to the ratchet holder 60. The curved portions 103 of the friction spring 62A are placed in an annular recess 108 formed between the annular flange 104 and the ring member 106. This prevents displacement between the friction spring 62A and ratchet holder 60 in the axial direction.

Next, operations of the work machine 10 (lawn mower 12) constructed in this way will be described.

With the lawn mower 12 shown in FIG. 1, when the cutter blade 22 rotates clockwise in plan view under the driving action of the motor 26A, the cutter blade 22 cuts the grass growing on the lawn right beneath the lawn mower 12. At this time, an air current (swirling wind) swirling in the same direction as the cutter blade 22 is formed inside the lower housing 32L. Then, the cut grass (mown grass) is sent into the mown grass storage 25 by the conveying wind (swirling wind) thus generated.

Figure 6A:
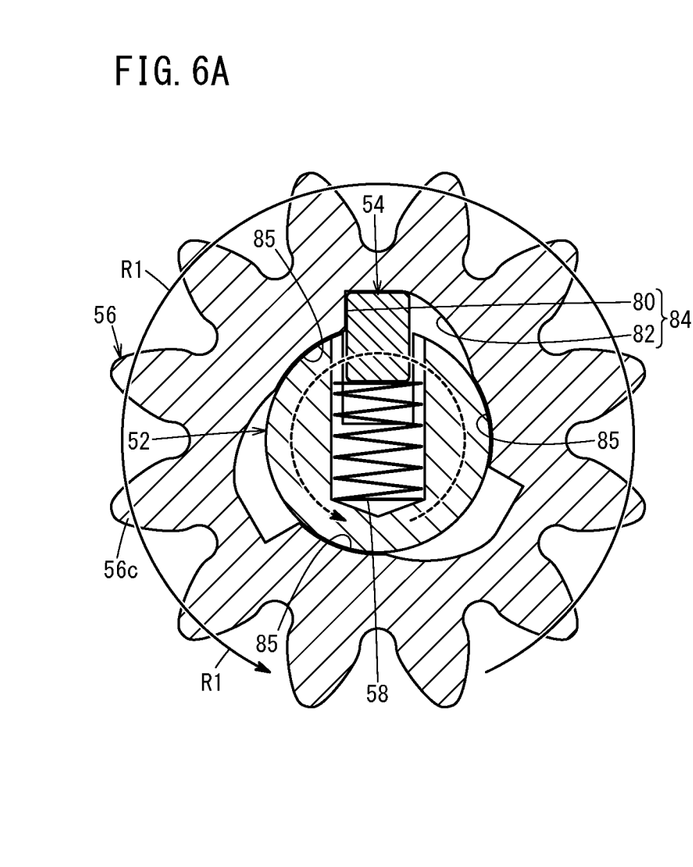
FIG. 6A is a diagram used to describe how a drive shaft and a driven member operate when the drive shaft rotates normally (when a driving force is transmitted), and FIG. 6B a diagram used to describe how the drive shaft and a ratchet holder operate when the drive shaft rotates normally (when the driving force is transmitted)
Figure 6B:
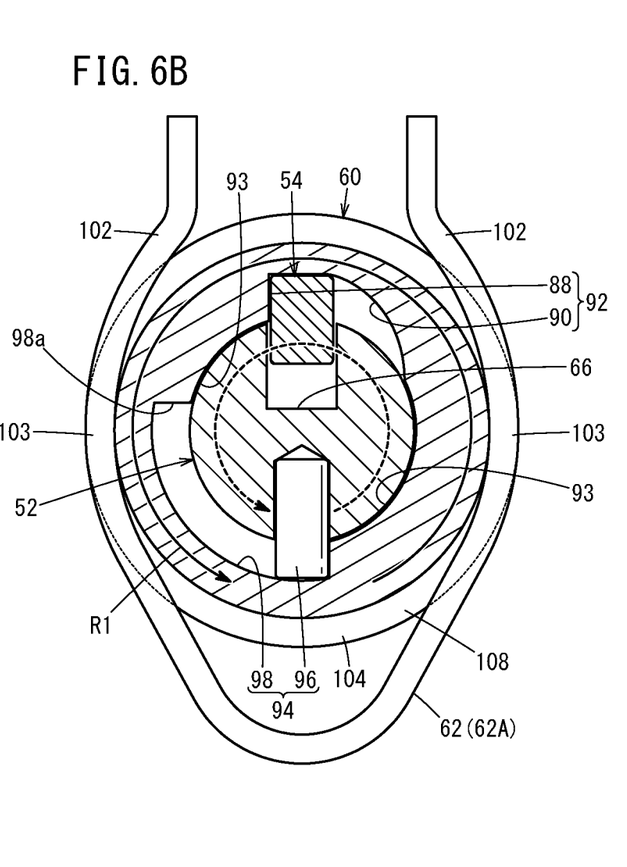

On the other hand, the driving force of the motor 26A is transmitted to the wheel 20 serving as a driving wheel, through the motive power transmission mechanism 34, the motive power direction conversion mechanism 36, and the clutch mechanism 46. Thus, the wheel 20 rotates in a first rotational direction (in the direction shown by arrow R1: rotates normally), causing the lawn mower 12 to move forward. In this case, as shown in FIG. 6A, as the drive shaft 52 rotates in the first rotational direction based on the driving force of the motor 26A, the driven member 56 is rotationally driven in the first rotational direction by the rotating drive shaft 52 through the key member 54. At this time, as shown in FIG. 6B, the key member 54 is protruding from the key placement groove 66 of the drive shaft 52 and is in engagement with the engagement groove 88 of the ratchet holder 60. Accordingly, as the drive shaft 52 rotates, the ratchet holder 60 rotates in the first rotational direction (rotates normally) against the holding force (grasping force) of the holding member 62.

When the motor 26A is at a standstill, the clutch mechanism 46 operates as shown below.

Figure 7A:
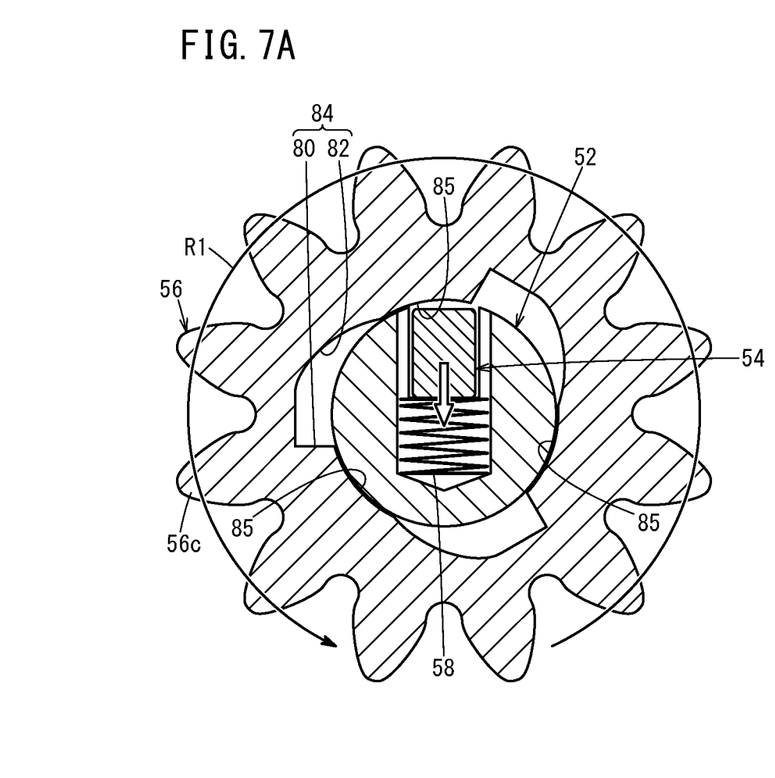
FIG. 7A is a diagram used to describe how the drive shaft and the driven member operate when the wheel rotates normally.
Figure 7B:
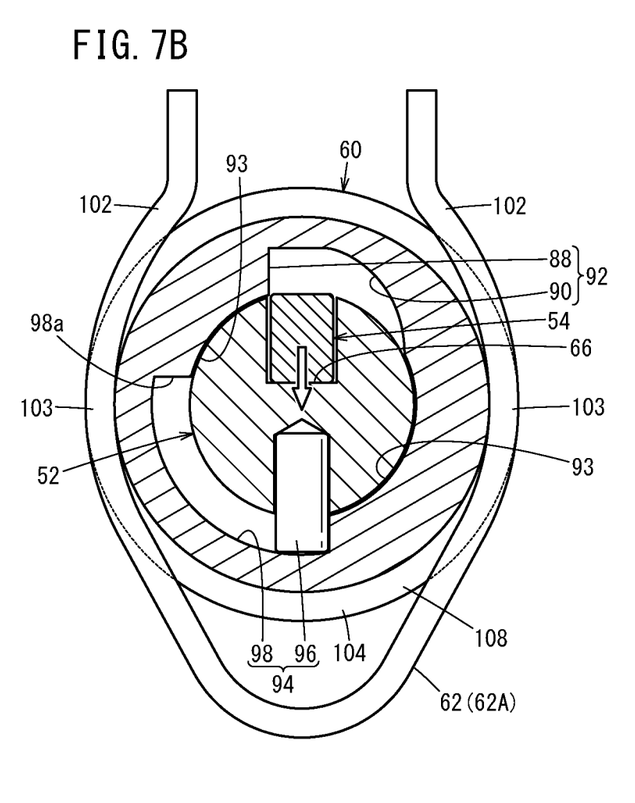
FIG. 7B is a diagram used to describe how the drive shaft and the ratchet holder operate when the wheel rotates normally.

As shown in FIG. 7A, when the driven member 56 is rotated in the first rotational direction by a force transmitted from the wheel 20, the driven member 56 rotates in the first rotational direction relative to the non-rotating drive shaft 52, while pressing the key member 54 into the drive shaft 52 against the biasing force of the biasing member 58. That is, as the driven member 56 rotates in the first rotational direction, the key member 54 is pressed inward in the radial direction by the rotating guide portions 82 and moves into the key placement groove 66. Thus, the driven member 56 can spin in the first rotational direction relative to the drive shaft 52. At this time, as shown in FIG. 7B, the ratchet holder 60 is held by the holding member 62 (friction spring 62A) and therefore does not rotate.

Figure 8A:
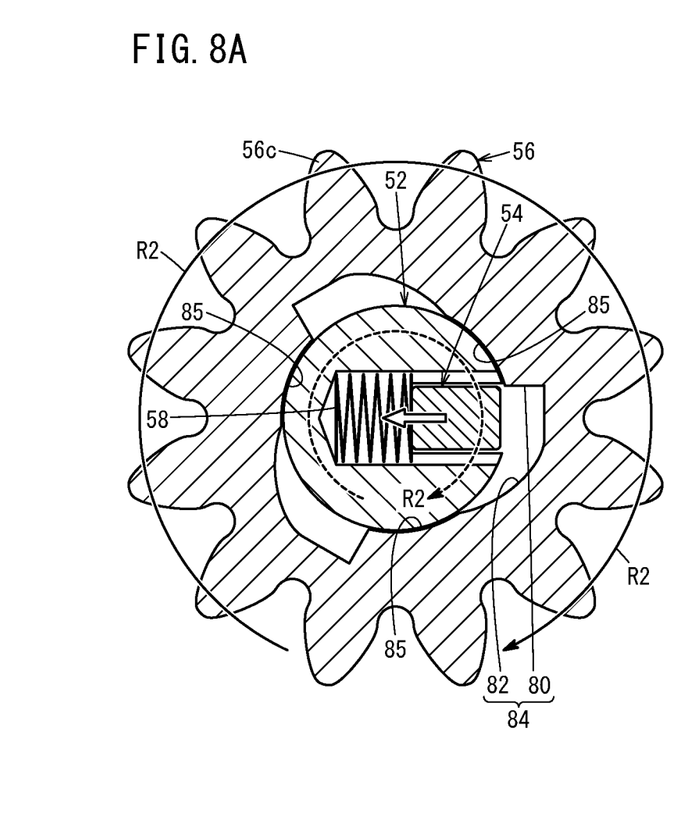
FIG. 8A is a diagram used to describe how the drive shaft and the driven member operate when the wheel rotates reversely.
Figure 8B:
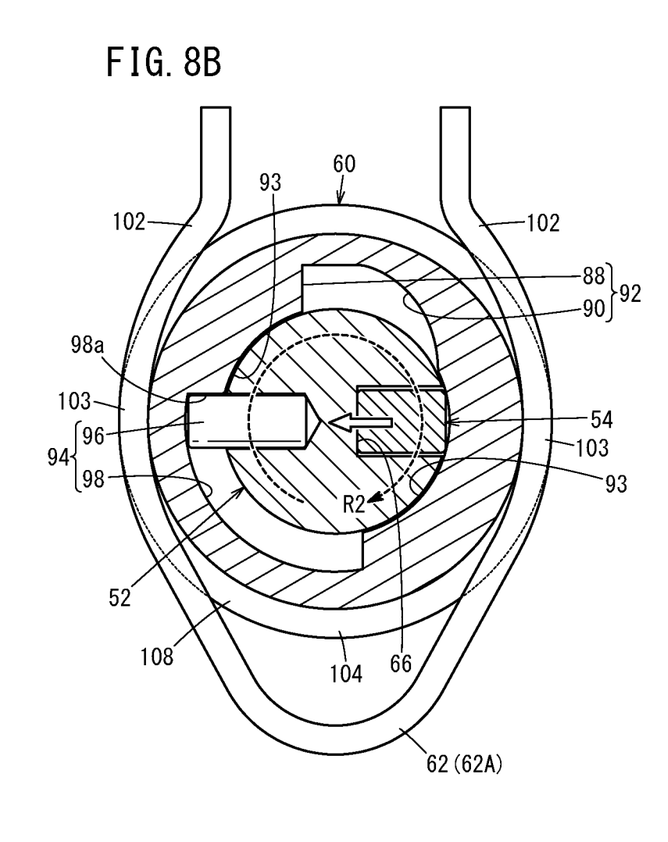
FIG. 8B is a diagram used to describe how the drive shaft and the ratchet holder operate when the wheel rotates reversely.

As shown in FIG. 8A, when the driven member 56 is rotated in a second rotational direction (in the direction shown by arrow R2: reversely rotated) by a force transmitted from the wheel 20, the drive shaft 52 receives a rotational force in the second rotational direction from the driven member 56 through the key member 54 that is engaged in the engagement groove 80. The drive shaft 52 hence starts rotating in the second rotational direction together with the driven member 56. Then, as shown in FIG. 8B, the key member 54 rotating in the second rotational direction is pressed inward in the radial direction by the inner circumferential shape of the ratchet holder 60 (guide portion 90 and inner support surface 93) that is held by the holding member 62 and so prevented from rotating. The key member 54 is thus guided into the key placement groove 66.

This releases the engagement between the key member 54 and the driven member 56. In this case, when the drive shaft 52 has rotated by a given angle (90 degrees in this embodiment) in the second rotational direction with respect to the ratchet holder 60, the restricting protrusion 96 abuts on an end wall 98a of the arc-shaped groove 98, whereby the rotational phase between the ratchet holder 60 and the drive shaft 52 is maintained. Accordingly, as shown in FIG. 8A, the key member 54 is kept pressed into the key placement groove 66. This allows the driven member 56 to spin in the second rotational direction relative to the drive shaft 52. Further, the driven member 56 can also spin in the first rotational direction relative to the drive shaft 52 while the state of FIG. 8B is maintained.

Figure 9A:
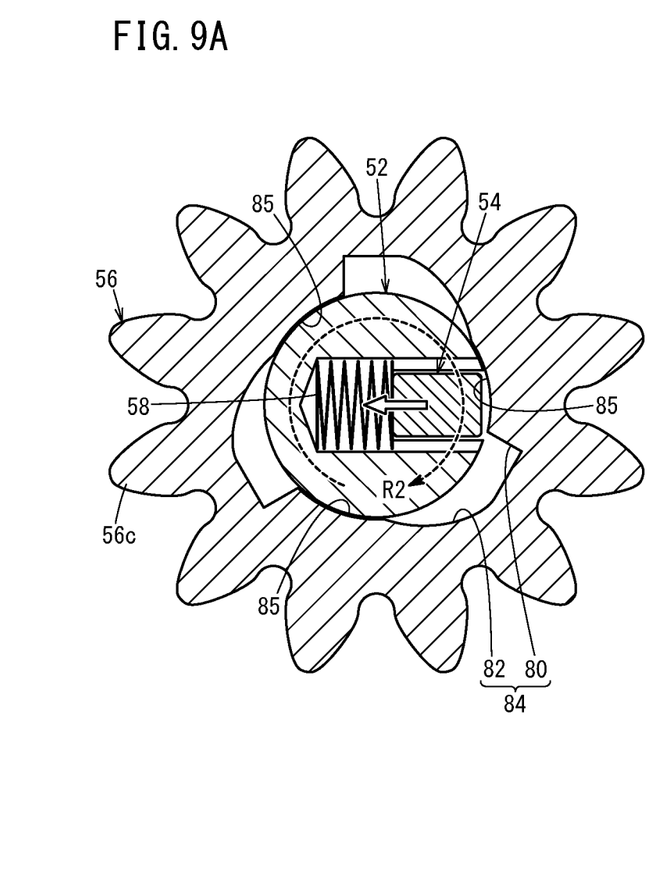
FIG. 9A is a diagram used to describe how the drive shaft and the driven member operate when the drive shaft rotates reversely, and FIG. 9B a diagram used to describe how the drive shaft and the ratchet holder operate when the drive shaft rotates reversely.

In the case of FIGS. 8A and 8B, it is necessary for the operator to reversely rotate the wheels 20 after the motor 26A has stopped. Accordingly, the control unit 30 (FIG. 1) may be configured to control the motor 26A to cause the drive shaft 52 to rotate by a given angle in the second rotational direction after the motor 26A has been stopped based on a stopping operation by the operator, to thereby release the engagement between the key member 54 and the driven member 56. In this case, specifically, as shown in FIGS. 9A and 9B, by rotating the drive shaft 52 by a given angle (90 degrees in this embodiment) in the second rotational direction with the driving force of the motor 26A, the key member 54 is pressed into the key placement groove 66 by the inner circumferential shape of the driven member 56 (guide portion 82 and inner support surface 85) or by the inner circumferential shape of the ratchet holder 60 (guide portion 90 and inner support surface 93).

Figure 9B:
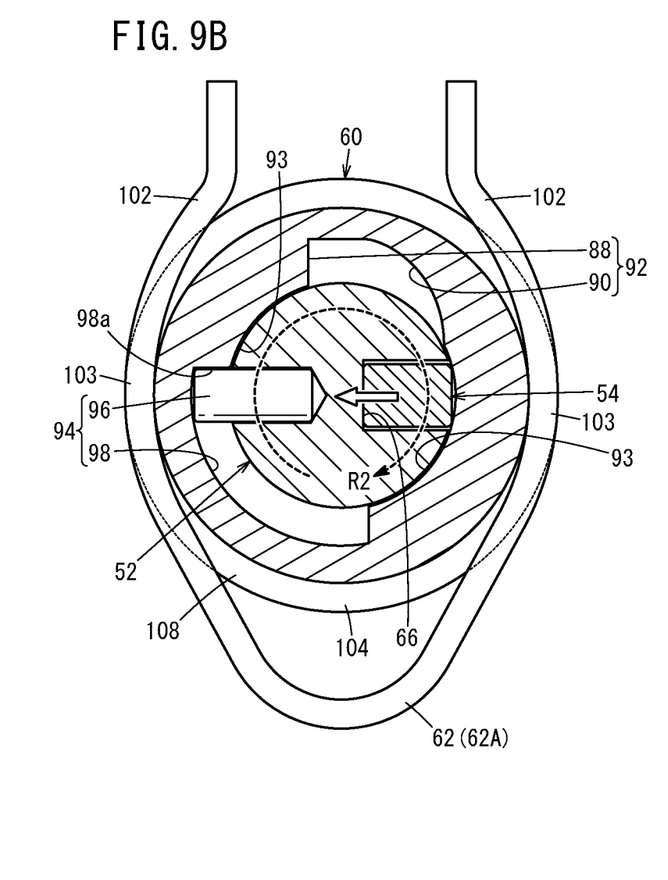

At this time, as shown in FIG. 9B, when the drive shaft 52 has rotated by the given angle (90 degrees in this embodiment) in the second rotational direction with respect to the ratchet holder 60, the restricting protrusion 96 abuts on the end wall 98a of the arc-shaped groove 98, whereby the rotational phase between the ratchet holder 60 and the drive shaft 52 is maintained. The key member 54 is thus kept pressed into the key placement groove 66. This allows the driven member 56 to spin in both the first rotational direction and second rotational direction relative to the drive shaft 52.

The work machine 10 (lawn mower 12) according to this embodiment offers the effects below.

According to the work machine 10, when the driven member 56 rotates in the first rotational direction (arrow R1 direction), the driven member 56 itself presses the key member 54 into the drive shaft 52, allowing the driven member 56 to spin in the first rotational direction relative to the drive shaft 52 (FIGS. 7A, 7B). Further, when the driven member 56 rotates in the second rotational direction (arrow R2 direction), the engagement between the key member 54 and the driven member 56 is released, allowing the driven member 56 to spin in the second rotational direction relative to the drive shaft 52 (FIGS. 8A, 8B). In this way, according to the work machine 10, it is possible to cause the wheel 20 to spin relative to the drive shaft 52 in both the forward and rearward directions while the motor 26A is standing still. The work machine 10 can thus be moved easily while the motor 26A is at a standstill.

After the motor 26A has been stopped based on a stopping operation performed by the operator, the control unit 30 controls the motor 26A so as to rotate the drive shaft 52 by a given angle in the second rotational direction, to thereby release the engagement between the key member 54 and the driven member 56 (FIGS. 9A, 9B). With this configuration, the wheels 20 can always be disconnected from the power system when the motor 26A stops, eliminating the need for the operator to reversely rotate the wheels 20 after the motor 26A has stopped. This further reduces labor of the operator.

The clutch mechanism 46 includes the holding member 62 that holds the ratchet holder 60 and allows the ratchet holder 60 to rotate when a certain or larger rotational force acts on the ratchet holder 60. It is thus possible to control rotation and non-rotation of the ratchet holder 60 with a simple structure, according to the force acting on the holding member 62.

When the drive shaft 52 rotates in the first rotational direction based on the driving force of the motor 26A, the ratchet holder 60 rotates in the first rotational direction, while sliding relative to the holding member 62 (FIG. 6B). This configuration allows the drive shaft 52 to smoothly rotate in the first rotational direction based on the driving force of the motor 26A.

When the driven member 56 rotates in the second rotational direction by a force transmitted from the wheel 20, the holding member 62 prevents the ratchet holder 60 from rotating in the second rotational direction (FIG. 8B). With this configuration, it is possible to certainly press in the key member 54 by the inner circumferential shape of the ratchet holder 60 as the drive shaft 52 rotates in the second rotational direction.

The holding member 62 is the friction spring 62A that holds the ratchet holder 60 with an elastic force. It is thus possible to restrict the rotation of the ratchet holder 60 under a given condition, using a simple structure.

The restricting structure 94 is disposed between the ratchet holder 60 and the drive shaft 52, the restricting structure 94 stopping relative rotation between the ratchet holder 60 and the drive shaft 52 when the drive shaft 52 has moved to a position where the engagement between the key member 54 and the driven member 56 is released. With this configuration, when the drive shaft 52 has moved to the position where the engagement between the key member 54 and the driven member 56 is released, the rotational phase between the ratchet holder 60 and the drive shaft 52 is maintained (FIGS. 8B, 9B). This enables the key member 54 to be surely kept pressed into the drive shaft 52.

The restricting structure 94 includes the restricting protrusion 96 protruding radially outward from the drive shaft 52, and the arc-shaped groove 98 which is formed in the ratchet holder 60 and in which the restricting protrusion 96 is inserted. Thus, it is possible to stop the relative rotation between the ratchet holder 60 and the drive shaft 52 with a simple configuration, at the time when the drive shaft 52 has rotated by a given angle in the second rotational direction.

The key member 54 includes the first engagement portion 75 that can engage with the driven member 56, and the second engagement portion 76 that can engage with the engagement groove 88 of the ratchet holder 60. The key member 54 is disposed so as to be tiltable relative to the drive shaft 52. The first engagement portion 75 is disposed between the tilting fulcrum of the key member 54 and the second engagement portion 76. With this configuration, it is possible to cause the key member 54 to suitably operate according to the phase between the drive shaft 52, and the driven member 56 and the ratchet holder 60 in the rotational direction.

The biasing member 58 is disposed between the key member 54 and the drive shaft 52 so as to bias a portion of the key member 54 that is located between the second engagement portion 76 and the tilting fulcrum. This configuration allows the key member 54 to tilt suitably.

The tilt support member 68 having the tilting fulcrum is fixed to the drive shaft 52. It is thus possible to tilt the key member 54 relative to the drive shaft 52 with a simple structure.

The tilt support member 68 is formed as the ring-like washer member 68A having the inner protrusion 70 protruding radially inward and functioning as the tilting fulcrum, and the washer member 68A prevents the driven member 56 from coming off the drive shaft 52. Thus, the tilt support member 68 functions both as a retainer for the driven member 56 and as the tilting fulcrum of the key member 54, whereby the structure is streamlined.

The key member 54 includes the groove 78 in which the inner protrusion 70 is inserted. This configuration prevents displacement between the key member 54 and the drive shaft 52 in the axial direction.

The present invention is not limited to the embodiment described above, but can be modified in various manners without departing from the essence and gist of the present invention.

What is claim is:

1. A work machine comprising:
   a driving source;
   a wheel for travel configured to be driven by a driving force of the driving source;
   and a clutch mechanism disposed on a motive power transmission route between the driving source and the wheel,
the clutch mechanism including
a drive shaft to which the driving force from the driving source is transmitted,
a key member that is movable with respect to the drive shaft,
a driven member that is rotatable coaxially with the drive shaft and is configured to be driven by the drive shaft through the key member,
a biasing member configured to bias the key member against the driven member,
and
a ratchet holder including an engagement groove engageable with the key member, and a guide portion configured to guide the key member, the ratchet holder being rotatable coaxially with the drive shaft,
wherein when the drive shaft rotates in a first rotational direction while or when being driven by the driving force of the driving source, the driven member is rotationally driven in the first rotational direction by the drive shaft through the key member,
when the driven member rotates in the first rotational direction by a force transmitted from the wheel, the driven member rotates in the first rotational direction relative to the drive shaft, while pressing the key member into the drive shaft against a biasing force of the biasing member, and
when the driven member rotates in a second rotational direction opposite to the first rotational direction by a force transmitted from the wheel, the guide portion of the ratchet holder presses the key member into the drive shaft so as to release engagement between the key member and the driven member, and the driven member rotates in the second rotational direction relative to the drive shaft.

2. The work machine according to claim 1, further comprising a control unit configured to control the driving source,
wherein, after stopping the driving source based on a stopping operation performed by an operator, the control unit controls the driving source so as to rotate the drive shaft by a given angle in the second rotational direction, to thereby release the engagement between the key member and the driven member.

3. The work machine according to claim 1, wherein the clutch mechanism includes a holding member configured to hold the ratchet holder and allowing the ratchet holder to rotate when a certain or larger rotational force acts on the ratchet holder.

4. The work machine according to claim 3, wherein when the drive shaft rotates in the first rotational direction while or when being driven by the driving force of the driving source, the ratchet holder rotates in the first rotational direction while sliding relative to the holding member.

5. The work machine according to claim 3, wherein when the driven member rotates in the second rotational direction by a force transmitted from the wheel, the holding member prevents the ratchet holder from rotating in the second rotational direction.

6. The work machine according to claim 3, wherein the holding member is a friction spring configured to hold the ratchet holder with an elastic force.

7. The work machine according to claim 1, wherein a restricting structure is disposed between the ratchet holder and the drive shaft, the restricting structure being configured to stop relative rotation between the ratchet holder and the drive shaft when the drive shaft has moved to a position where the engagement between the key member and the driven member is released.

8. The work machine according to claim 7, wherein the restricting structure includes a restricting protrusion protruding radially outward from the drive shaft, and an arc-shaped groove which is formed in the ratchet holder and in which the restricting protrusion is inserted.

9. The work machine according to claim 1,
wherein the key member includes a first engagement portion engageable with the driven member, and a second engagement portion engageable with the engagement groove of the ratchet holder, and the key member is tiltable relative to the drive shaft, and
the first engagement portion is disposed between a tilting fulcrum of the key member and the second engagement portion.

10. The work machine according to claim 9, wherein the biasing member is disposed between the key member and the drive shaft so as to bias a portion of the key member that is located between the second engagement portion and the tilting fulcrum.

11. The work machine according to claim 9, wherein a tilt support member having the tilting fulcrum is fixed to the drive shaft.

12. The work machine according to claim 11,
wherein the tilt support member is formed as a ring-like washer member including an inner protrusion protruding radially inward and functioning as the tilting fulcrum, and
the washer member prevents the driven member from coming off the drive shaft.

13. The work machine according to claim 12, wherein the key member includes a groove in which the inner protrusion is inserted.

14. The work machine according to claim 1,
wherein the wheel has an inner circumferential portion formed as an internal gear, and
the driven member is a gear member that meshes with the internal gear of the wheel.

15. The work machine according to claim 1, wherein the work machine is a lawn mower.

* * * * *